United States Patent [19]

Wieczorek et al.

[11] Patent Number: 5,102,085
[45] Date of Patent: Apr. 7, 1992

[54] VEHICLE INTERIOR ACCESSORY ASSEMBLY FOR HOLDING LIQUID CONTAINERS AND THE LIKE

[75] Inventors: Joseph P. Wieczorek, Madison Heights; Mark A. Traub, Clarkston; Michael D. Uhazie, Rochester Hills; Kirk Jensen, Novi, all of Mich.

[73] Assignee: Takata, Inc., Auburn Hills, Mich.

[21] Appl. No.: 684,287

[22] Filed: Apr. 12, 1991

[51] Int. Cl.⁵ .................................................. A47K 1/08
[52] U.S. Cl. .................................. 248/311.2; 224/42.45 R
[58] Field of Search .................... 248/311.2, 346, 146, 248/149; 220/409, 408, 8; 224/275, 42.11, 42.42 R, 278, 42.45 R

[56] References Cited

U.S. PATENT DOCUMENTS

| | | |
|---|---|---|
| D. 309,978 | 8/1990 | Fluharty . |
| 1,951,261 | 3/1934 | Thompson . |
| 2,711,213 | 6/1955 | Owens . |
| 2,763,395 | 9/1956 | Meek .................... 248/149 X |
| 3,019,050 | 1/1962 | Spielman . |
| 3,184,201 | 5/1965 | Smith .................... 248/311.2 |
| 3,357,614 | 12/1967 | Berg . |
| 3,395,787 | 8/1968 | Plaskan .................... 220/8 X |
| 3,561,589 | 2/1971 | Larkin .................... 224/42.11 |
| 3,615,118 | 10/1971 | Buxton . |
| 3,632,158 | 1/1972 | Boothe . |
| 3,695,689 | 10/1972 | Barecki . |
| 3,795,422 | 3/1974 | Robinson et al. . |
| 3,804,233 | 4/1974 | Gregg, Jr. . |
| 3,979,011 | 9/1976 | Schleicher .................... 220/8 X |
| 4,087,126 | 5/1978 | Wynn . |
| 4,194,585 | 3/1980 | Prince . |
| 4,202,030 | 5/1980 | Kimura . |
| 4,241,383 | 12/1980 | Shea . |
| 4,241,870 | 12/1980 | Marcus . |
| 4,275,913 | 6/1981 | Marcus . |
| 4,275,916 | 6/1981 | Skogler . |
| 4,300,709 | 11/1987 | Page .................... 224/275 |
| 4,417,764 | 11/1983 | Marcus et al. . |
| 4,469,365 | 9/1984 | Marcus et al. . |
| 4,509,656 | 4/1985 | Rosler .................... 220/8 |
| 4,512,503 | 4/1985 | Gioso . |
| 4,521,051 | 6/1985 | Cody et al. . |
| 4,595,228 | 6/1986 | Chu . |
| 4,640,542 | 2/1987 | Watjer et al. . |
| 4,643,342 | 2/1987 | Borelli .................... 224/275 X |
| 4,690,241 | 9/1987 | Miyadera . |
| 4,784,112 | 11/1988 | Hayashi .................... 220/8 X |
| 4,801,060 | 1/1989 | Thompson .................... 224/275 |
| 4,927,200 | 5/1990 | Wilkins . |
| 4,942,990 | 7/1990 | White . |
| 4,943,111 | 7/1990 | Vander Laan . |

Primary Examiner—J. Franklin Foss
Attorney, Agent, or Firm—Harness, Dickey & Pierce

[57] ABSTRACT

An exemplary accessory assembly for a vehicle interior is adapted in its preferred embodiments for receiving and holding generally cylindrical items, such as liquid beverage containers, having different diameters or shapes. Such an accessory assembly includes a generally hollow, cylindrical base portion and a generally hollow, cylindrical receptacle slidably disposed therein for axial movement at least between extended and retracted positions.

33 Claims, 4 Drawing Sheets

VEHICLE INTERIOR ACCESSORY ASSEMBLY FOR HOLDING LIQUID CONTAINERS AND THE LIKE

BACKGROUND AND SUMMARY OF THE INVENTION

The invention relates generally to accessory assemblies for vehicle interiors, with the invention being especially well-suited for accessory assemblies adapted for receiving and holding generally cylindrical items of different diameters, such as liquid beverage containers.

It is desirable to provide facilities for receiving, storing, or holding miscellaneous items in the interior of a vehicle. The difficulty that is frequently encountered in providing these facilities stems from the fact that such miscellaneous items are often of different shapes or sizes and thus present special storage or holding problems in a moving vehicle. These difficulties are particularly troublesome in providing holding facilities for liquid beverage containers, which are typically found in a very wide variety of shapes and sizes, with the contents of such containers being easily spilled when the containers are open. In addition, although most liquid beverage containers are generally cylindrical in shape, they frequently have tapered sides, or handles protruding outwardly from their sidewalls.

The present invention seeks to address the problems and difficulties described above in providing an accessory assembly for a vehicle that is selectively extendible and retractable in order to accommodate different shapes and sizes of items received and held therein. The present invention is especially advantageously employed for holding liquid beverage containers of varying shapes, sizes, and configurations, while allowing the accessory assembly according to the present invention to be retracted in order to present a neat appearance during non-use.

An accessory assembly for a vehicle interior is adapted in its preferred embodiment for receiving and holding generally cylindrical items of different diameters placed therein. Such an accessory assembly includes a generally hollow, cylindrical base portion and a generally hollow, cylindrical receptacle, with the receptacle being disposed at least partially within the base portion in a substantially coaxial relationship therewith. The receptacle is selectively and slidably movable in an axial direction within the base portion at least between an extended position and a retracted position.

In order to accommodate such selective movement of the receptacle with respect to the base portion, the base portion includes at least one recess, groove, or slot formed in its base sidewall, with the receptacle having at least one resiliently deflectable protuberance protruding radially outwardly therefrom. Such protuberance is resiliently biased radially outwardly for engaging, and being received in, the recess in the base portion in order to hold the receptacle in its extended position. The protuberance is also resiliently deflectable radially inwardly out of engagement with the recess in order to allow the receptacle to be selectively moved from its extended position to its retracted position.

Preferably, an anti-rotation feature is provided for substantially preventing circumferential rotation of the receptacle within the base cylinder. The receptacle and the base portion also preferably include cut-out portions of their respective sidewalls, with the respective cut-out portions being substantially coextensive and substantially aligned, both circumferentially and axially, when the receptacle is in its retracted position. Another preferred feature of the present invention includes configurations of the receptacle's resiliently deflectable protuberance and the base portion's sidewall such that the protuberance contacts a part of the base portion in both its extended and retracted positions, thereby substantially preventing any tendency of the receptacle to rattle within the base portion. Also, since vehicle interiors are typically exposed to extreme variations in temperature throughout seasonal use, such configurations are preferably adapted to minimize undesirable effects resulting from temperature-caused pre-loads on the resiliently deflectable protuberances or from the protuberances taking an undesirable set over time, with repeated usage. Finally, an accessory assembly according to the present invention also preferably prevents unintentional removal of the receptacle from within the base portion, while still providing the capability of intentional removal for cleaning or replacement.

Additional objects, advantages, and features of the present invention will become apparent from the following description and appended claims, taken in conjunction with the accompanying drawings.

DETAILED DESCRIPTION OF THE PREFERRED EMBODIMENTS

FIGS. 1 through 7 illustrate exemplary embodiments of the present invention as applied in an accessory assembly for holding liquid beverage containers of different shapes, sizes, and configurations. One skilled in the art will readily recognize from the following discussion that the present invention is equally applicable to other accessory assemblies adapted for receiving, storing, or holding other miscellaneous items, as well as to other non-storage or non-holding applications, or even to other non-vehicular applications.

Figure 1:
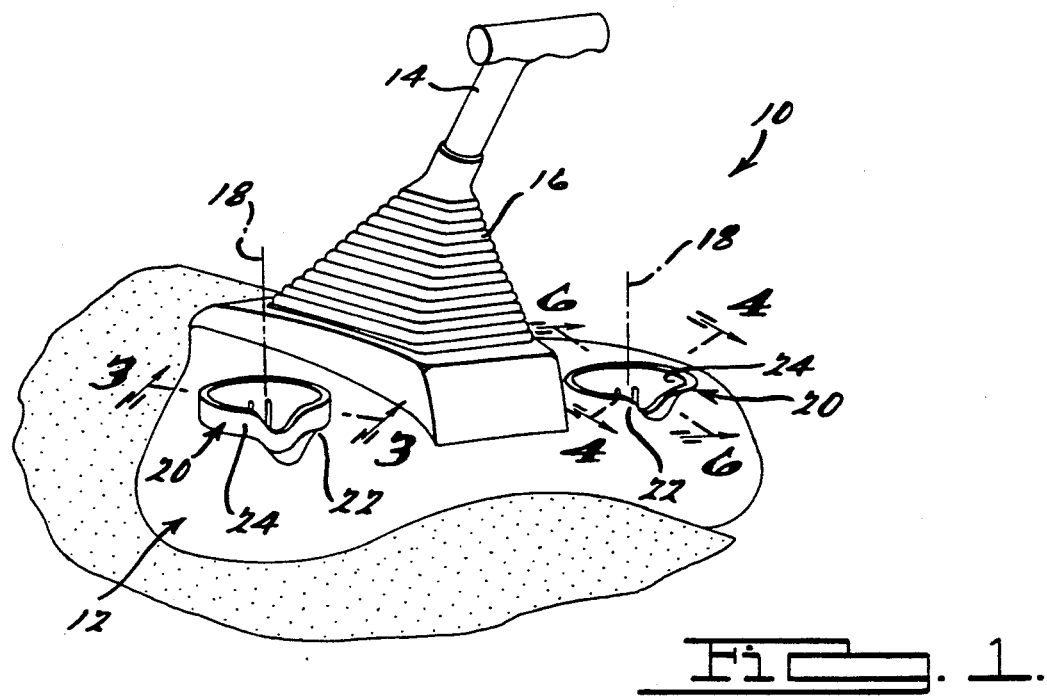
FIG. 1 is a partial perspective view of an exemplary application of an accessory assembly according to the present invention, shown for purposes of illustration in the console area of a vehicle interior.

Referring initially to FIG. 1, a vehicle interior 10 is partially illustrated and includes a console assembly 12 and a gearshift lever 14 with a gearshift lever boot 16. For purposes of illustration, the console assembly 12 includes one or more accessory or container holder assemblies 20, each including a base portion 22, within which a receptacle portion 24 is coaxially disposed about a common axis or coaxis 18. The receptacle 24 and the base portion 22 are preferably composed of a plastic composition.

As shown in FIGS. 2 through 6, the base portion 22 of the preferred exemplary accessory assembly 20 is of a generally hollow cylindrical configuration, having a base sidewall 26, an open base end 28, and a closed opposite base end 30. Similarly, the preferred receptacle portion 24 is of a complementary generally hollow and cylindrical configuration, having a receptacle sidewall 32, an open receptacle end 34, and a bottom or opposite receptacle end 36, in which an internal receptacle opening 38 is preferably formed, the purpose of which is described below.

Figure 3:
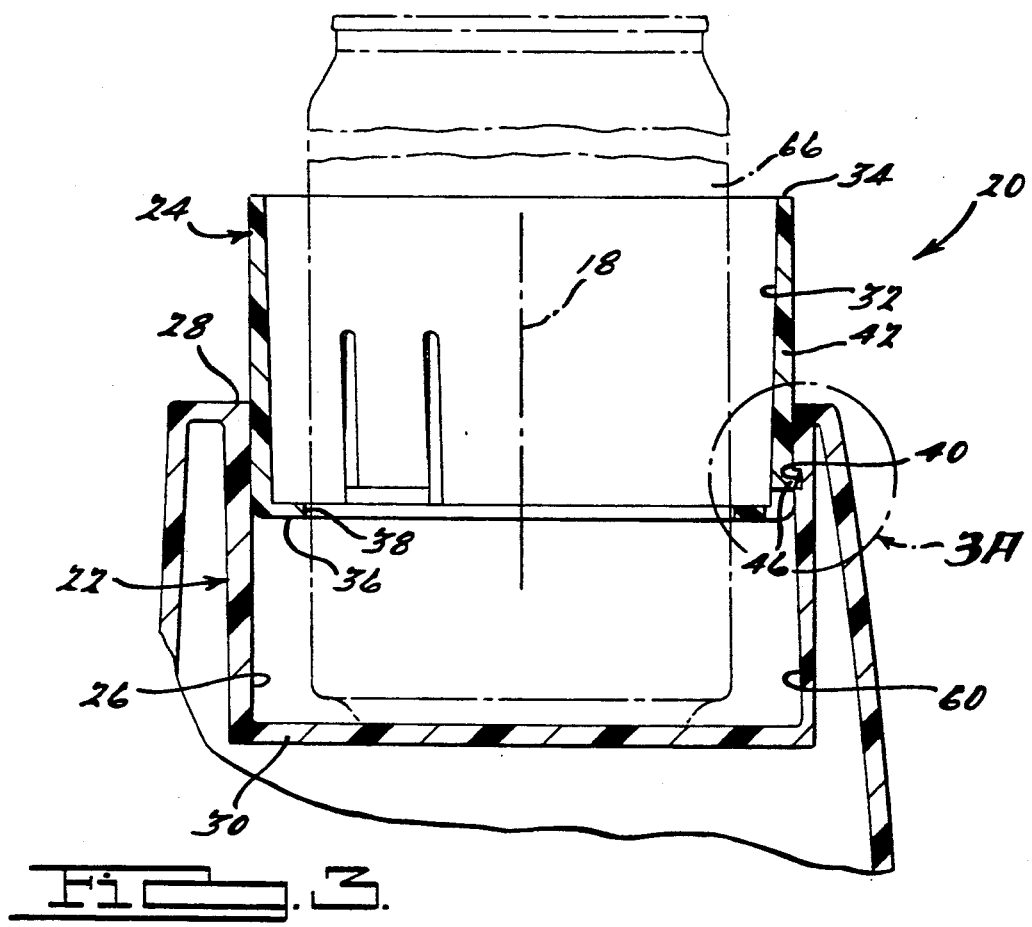
FIG. 3 is a cross-sectional view, taken generally along line 3—3 of FIG. 1, illustrating the receptacle in its extended position.
Figure 4:
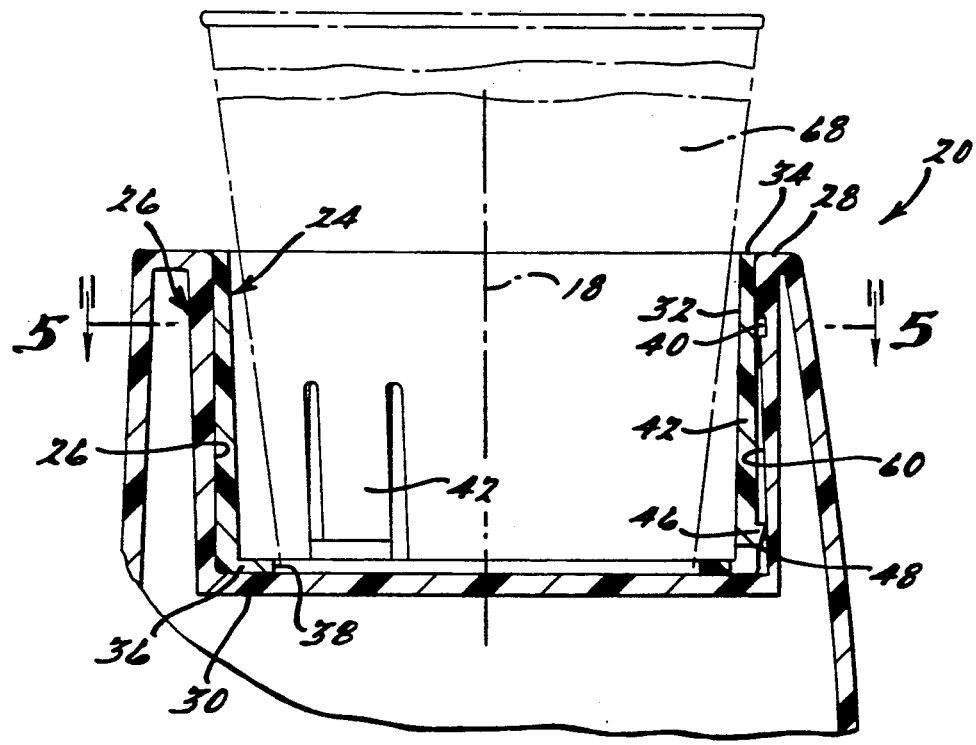
FIG. 4 is a cross-sectional view similar to that of FIG. 3, but taken generally along line 4—4 of FIG. 1, illustrating the receptacle in its retracted position.
Figure 3A:
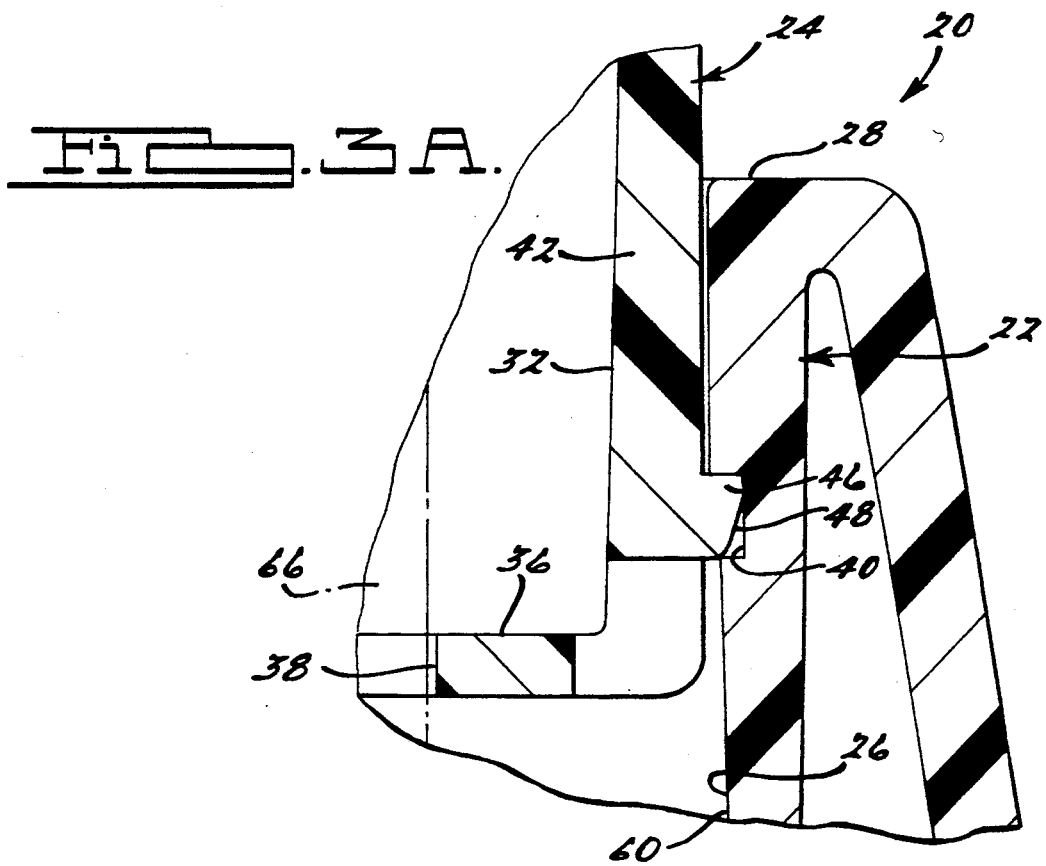
FIG. 3A is an enlarged detail view of the circled portion of FIG. 3, showing preferred relationship of a resilient finger or protuberance on the receptacle engaging a groove or recess in the base portion when the receptacle is in its extended position.

The receptacle 24 is preferably selectively extendible and retractable between at least two positions, namely an extended position shown in the right half of FIG. 1, and a retracted position shown in the left half of FIG. 1. Referring to FIGS. 3 and 4, the receptacle 24 is preferably slidably movable in a generally axial direction within the base portion 22, with the receptacle 24 being selectively held in its extended position by way of the releasable interaction of one or more recesses 40 formed within the base sidewall 26 and one or more resiliently deflectable fingers or other protuberances 42 on the receptacle sidewall 32.

Figure 2:
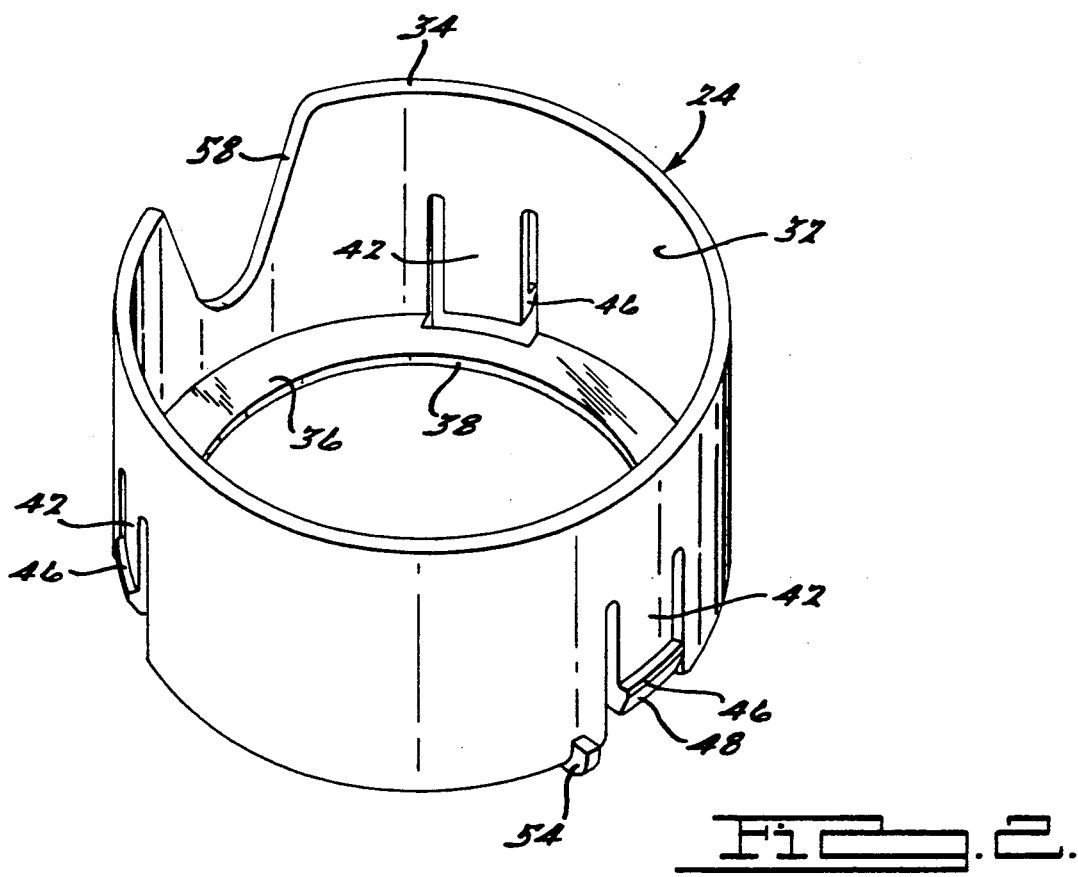
FIG. 2 illustrates a perspective view of the receptacle component of the accessory assembly of FIG. 1, removed from its respective base portion.

As perhaps best illustrated in FIGS. 2 through 4, the resilient fingers 42 preferably include a barb portion 46 protruding radially outwardly from their lower ends, with a ramp or cam portion 48 formed on the lower or inner areas of the barb portions 46. Thus, when the receptacle 42 is pulled axially outwardly or upwardly to its extended position, the resiliently deflectable fingers 42 are resiliently biased outwardly in order to engage the preferably annular recesses 40 in the base sidewall 26, thus releasably holding the receptacle 24 in its extended position. However, when it is desired to retract the receptacle 42, it can be merely urged downwardly by the user. Since the ramp or cam portions 48 tapered or sloped inwardly and downwardly, and because a small radius is preferably formed at their lower and outer edge, they exert a resilient camming force radially inwardly on the fingers 42 in order to disengage the barb portions 46 from the recesses 40, thereby allowing the receptacle to be urged inwardly or downwardly toward its retracted position, at which the bottom or opposite receptacle end 36 is substantially adjacent, and preferably abutting, the closed base end 30.

Figure 5:
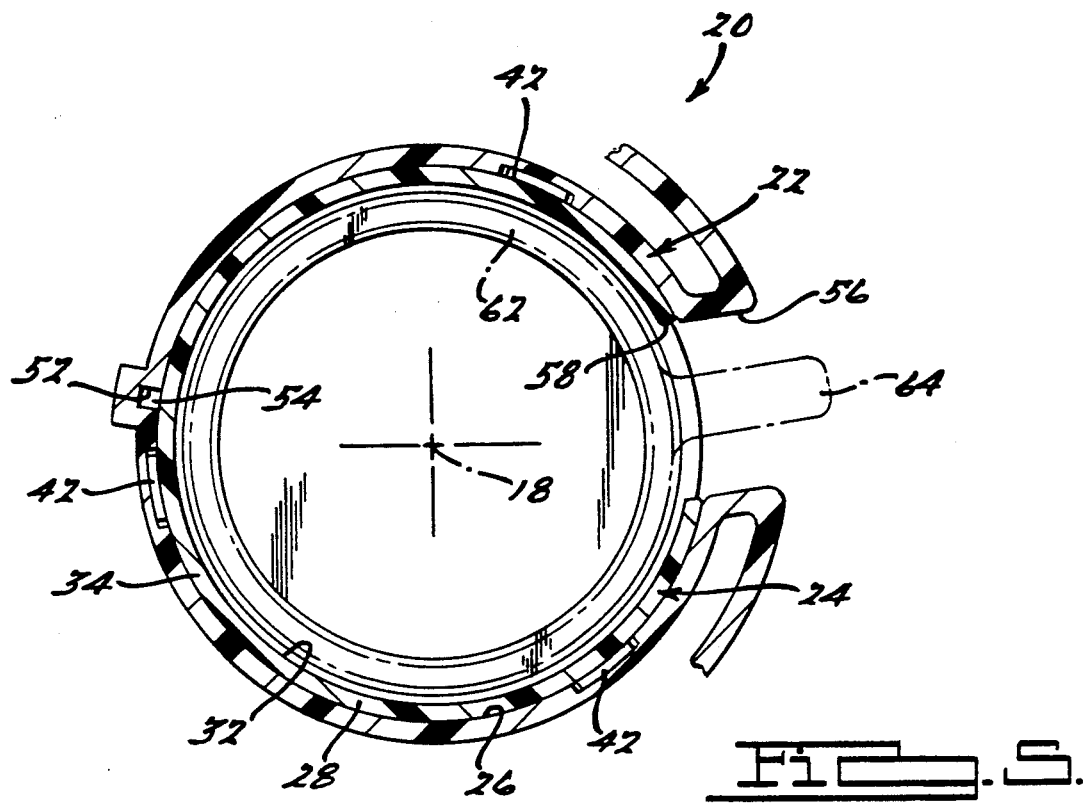
FIG. 5 is another cross-sectional view, taken generally along line 5—5 of FIG. 4, illustrating an optional but preferred configuration wherein the receptacle and the base portion have corresponding cut-out portions of their respective sidewalls.
Figure 6:
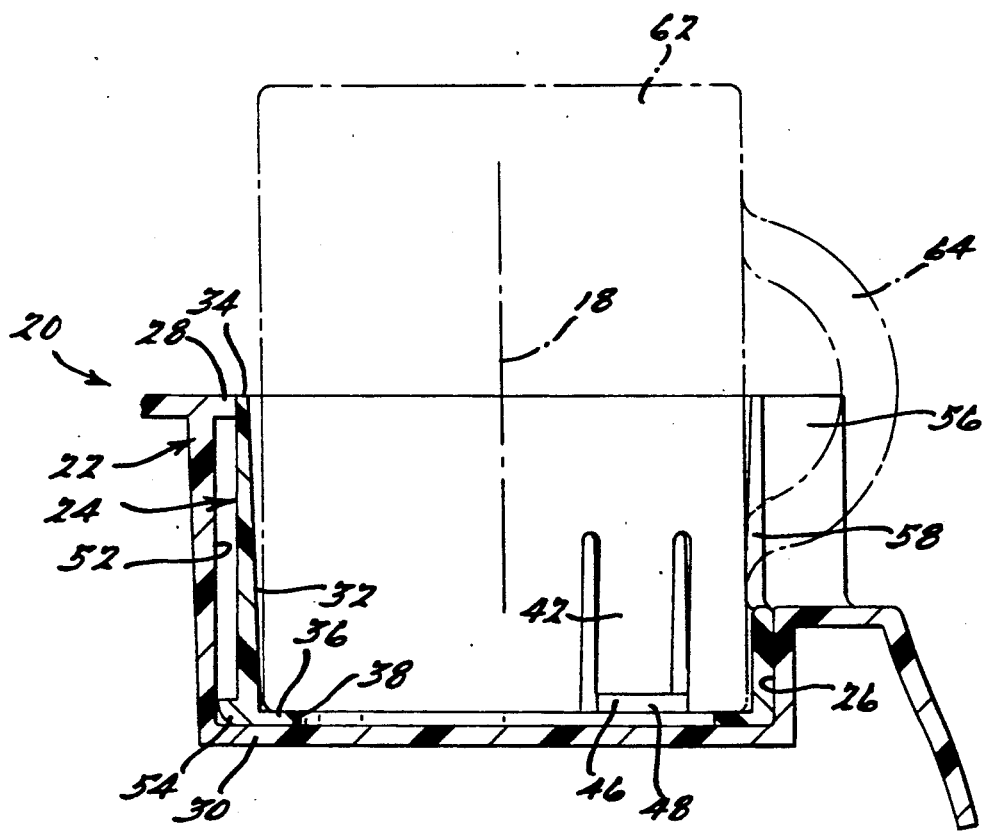
FIG. 6 is still another cross-sectional view, taken generally along line 6—6 of FIG. 1.

As illustrated primarily in FIGS. 5 and 6, the receptacle 24 preferably includes a receptacle cut-out area 58, with the base portion 22 having a similar, complementary base cut-out area 56. The base cut-out 56 and the receptacle cut-out 58 are configured to be substantially coextensive and aligned, both circumferentially and axially, when the receptacle 24 is in its retracted position in order to provide clearance and accommodation for a finger loop or handle 64 of a coffee cup 62. In order to assure that the receptacle cut-out 58 and the base cut-out 56 are properly aligned for such purpose, the base sidewall 26 preferably includes a generally axially-extending key slot 52, or other elongated opening, adapted for slidably receiving a key 54 or other such protrusion from the receptacle sidewall 32 of the receptacle 24. Besides providing for such circumferential alignment, the preferred key 54 and key slot 52 also substantially prevent unintentional removal of the receptacle 24 from the base portion 22, due to the fact that the preferred key slot 52 does not extend fully to the outer or upper edge of the open base end 28 (see FIG. 6). However, the upper or outer limit of the key slot 52 is preferably closely adjacent such open base end 28, thus allowing for intentional removal of the receptacle 24 from the base portion 22 merely by slightly tilting the extended receptacle 24 off the coaxis in order to allow it to be snapped out of the base portion 22. When it is desired to replace the receptacle 24 within the base portion 22, substantially the same procedure is followed, but in reverse, thereby snapping the receptacle back into its normal position. Such intentional removability is desired for purposes of cleaning within the base portion 22 or replacement of a damaged receptacle 24.

Referring primarily to FIGS. 3 and 4, it should be noted that the preferred base portion 22 has one or more lower or inner, radially outwardly-tapered portions 60 that are aligned with the recesses 40 and configured to provide clearance for the resilient fingers 42 when the receptacle 24 is moved to its retracted position, as well as tending to resiliently deflect the fingers 42 radially inwardly during upward or outward movement of the receptacle 24 to its extended position, thus positioning the barb portions 46 for engagement in the recess 40. Thus, the radial distance from the coaxis 18 to the radially outer depth of the recess 40 is substantially equal to the radial distance from the coaxis 18 to the area of contact between the barb portions 46 and the outwardly-tapered portion 60 of the base sidewall 26 when the receptacle 24 is in its retracted position. This feature is especially important and advantageous in vehicle interior applications, as well as other applications where a wide variety of temperatures or other conditions are encountered during normal usage and thus substantially prevents or minimizes any tendency of the resilient fingers 42 to take an undesirable set or pre-load during temperature variations or throughout usage, such as would detrimentally affect the performance of the accessory assembly 20.

In addition, the barb portions 46 on the lower or inner ends of the resilient fingers 42 are configured to protrude and be resiliently biased radially outwardly so that the barb portions 46 touch the radially outer wall of the recess 40 when the receptacle 24 is in its extended position, and similarly touch the outwardly-tapered portion 60 of the base sidewall 26 when the receptacle 24 is in its retracted position. This relationship thus substantially prevents or minimizes any tendency of the receptacle 24 to be loose or rattle within the base portion 22.

In normal usage, the exemplary accessory assembly 20 according to the present invention is adapted for receiving and holding generally cylindrical items, such as liquid beverage containers, having different diameters, heights, aspect ratios, or configurations. Referring to FIG. 3, wherein the receptacle 24 is in its extended position, with its bottom or opposite receptacle end 36 spaced away from the closed base end 30, a beverage container of a relatively small diameter, such as that commonly found on a soft drink can 66, can be received within the receptacle 24 and extend through the internal receptacle opening 38, abutting or resting on the closed base end 30. Such an arrangement not only allows for insertion of a soft drink can 66, but offers lateral support by way of the internal receptacle opening 38 in the bottom or opposite receptacle end 36, thus substantially preventing or minimizing the tendency of the soft drink can 66 to be easily tipped, thus spilling its contents. In addition, although not explicitly shown in FIG. 3, the extended receptacle 24 also is preferably adapted to receive and support frequently-encountered disposable beverage containers having downwardly and inwardly tapered sidewalls.

In addition to providing the above-described features for receiving and holding the containers described above, the receptacle 24 can be moved to its retracted position, thus allowing for insertion and support of beverage containers having lower aspect ratios and/or larger diameters, as shown in FIG. 4. Referring to FIGS. 5 and 6, the above-described base cut-out 56 and receptacle cut-out 58, which are substantially coextensive when the receptacle 24 is in its retracted position, the finger loop or handle 64 of a coffee cup or mug 62 can be conveniently accommodated. As mentioned above, the retracted receptacle 24 also allows the accessory assembly 20 to be used for receiving and holding other taller or larger diameter items, such as the milkshake container 68 shown in FIG. 4, whether or not such larger diameter containers have radially inwardly and downwardly tapered or sloping sidewalls.

Figure 7:
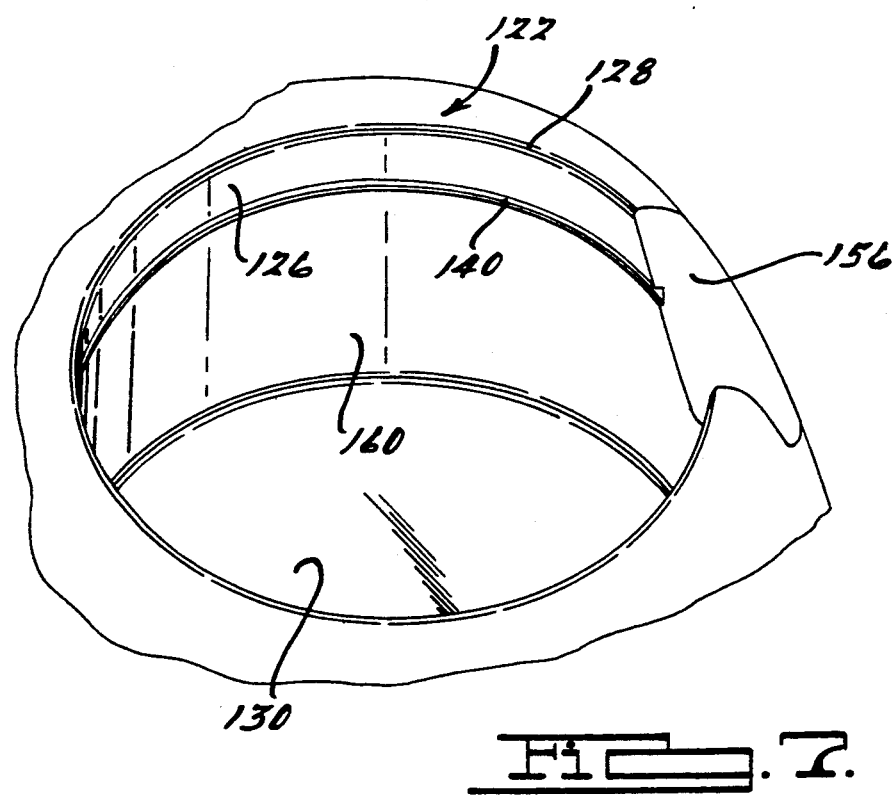
FIG. 7 is a perspective view of the base portion of an alternate embodiment of the present invention.

FIG. 7 illustrates an optional or alternate variation on the accessory assembly 20 illustrated in FIGS. 1 through 6. Because the accessory assembly 20 in FIGS. 1 through 6 and the accessory assembly 120 in FIG. 7 are very similar, and have similar or identical components, either in function or configuration, the components of FIG. 7 are indicated by reference numerals similar to those of corresponding components in FIGS. 1 through 6, with the reference numerals in FIG. 7 having one-hundred prefixes.

Preferably, the alternate variation depicted for purposes of illustration in FIG. 7 is substantially identical to that of FIGS. 1 through 6, with the exception that the discrete recesses 40 in the base sidewall 26 are replaced by a substantially circumferentially-extending or annular recess 140, with either discrete or similar circumferentially-extending annular-extending outwardly-tapered portions 160. In virtually all other respects, the performance and function of the accessory assembly 120 is the same as that described above for the accessory assembly 20.

The foregoing discussion discloses and describes merely exemplary embodiments or variations of the present invention for purposes of illustration only. One skilled in the art will readily recognize from such discussion and from the accompanying drawings and claims, that various changes, modifications, and variations can be made therein without departing from the spirit and scope of the invention as defined in the following claims.

What is claimed is:

1. An accessory assembly for a vehicle interior comprising:
    a base portion having a generally hollow base cylinder formed therein, said base cylinder having a base sidewall, an open base end, and a closed opposite base end; and
    a generally hollow cylindrical receptacle having a receptacle sidewall, an open receptacle end, and an opposite receptacle end, said receptacle being disposed substantially coaxially within said base cylinder with said open receptacle end and said open base end facing in the same axial direction, said receptacle being adapted to receive an item placed therein and further being selectively and slidably movable in an axial direction within said base cylinder between an extended position and a retracted position,
    said base cylinder having at least one recess formed in said base sidewall, and said receptacle having resiliently deflectable protuberance means protruding radially outwardly therefrom, said protuberance means being resiliently biased radially outwardly for engaging and being received in said recess to hold said receptacle in said extended position when said receptacle is selectively moved thereto, said protuberance means being resiliently deflectable radially inwardly out of engagement with said recess in order to allow said receptacle to be selectively moved from said extended position to said retracted position, a portion of said base sidewall being tapered radially outwardly from said recess to said closed opposite base end in order to accommodate said resiliently deflectable protuberance means when said receptacle is in said retracted position, said tapered portion of said base sidewall resiliently urging said protuberance means radially inwardly as said receptacle is moved axially from said retracted position toward said extended position and allowing said resiliently deflectable protuberance means to resiliently move radially outwardly as said receptacle is moved axially from said extended position toward said retracted position.

2. An accessory assembly according to claim 1, wherein said resiliently deflectable protuberance means includes a ramp portion thereon, said ramp portion facing in a direction generally toward said retracted position in order to exert a generally radially inwardly-directed camming force on said protuberance means when said receptacle is urged toward said retracted position in order to disengage said protuberance means from said recess and to thereby allow said receptacle to be selectively moved from said extended position to said retracted position.

3. An accessory assembly according to claim 1, wherein said recess comprises a circumferentially-extending recessed groove form in said base sidewall, said protuberance means including resiliently deflectable fingers on said receptacle, said fingers having barb portion thereon, said barb portions being resiliently biased radially outwardly by said fingers in order to be received in said recessed groove when said receptacle is selectively moved to said extended position.

4. An accessory assembly according to claim 3, wherein said barb portions each include a ramp portion thereon, said ramp portion facing in a direction generally toward said retracted position in order to exert a generally radially inwardly-directed camming force on said respective resiliently deflectable fingers when said receptacle is urged toward said retracted position in order to disengage said barb portions from said recessed groove and to thereby allow said receptacle to be selectively moved from said extended position to said retracted position.

5. An accessory assembly according to claim 1, wherein said base sidewall includes a number of said recesses formed therein, said protuberance means including resiliently deflectable fingers on said receptacle, said fingers having barb portions thereon, said barb portions each being resiliently biased radially outwardly by said fingers in order to be received within one of said recesses when said receptacle is selectively moved to said extended position.

6. An accessory assembly according to claim 5, wherein said barb portions each include a ramp portion thereon, said ramp portion facing in a direction generally toward said retracted position in order to exert a generally radially inwardly-directed camming force on said respective resiliently deflectable fingers when said receptacle is urged toward said retracted position in order to disengage said barb portions from said recess and to thereby allow said receptacle to be selectively moved from said extended position to said retracted position.

7. An accessory assembly according to claim 1, further comprising anti-rotation means for substantially preventing rotation of said receptacle in a generally circumferential direction within said base cylinder.

8. An accessory assembly according to claim 7, wherein said anti-rotation means includes a generally axially elongated opening formed in said base sidewall, and a key portion protruding generally radially outwardly from said receptacle, said key portion being slidably received within said axially elongated opening in order to allow said axial movement of said receptacle between said extended and retracted positions while substantially preventing said generally circumferential rotation of said receptacle within said base cylinder.

9. An accessory assembly according to claim 8, wherein said base cylinder and said receptacle each have a cut-out portion of their respective sidewalls, said respective cut-out portions being substantially coextensive and substantially aligned both circumferentially and axially when said receptacle is in said retracted position.

10. An accessory assembly according to claim 1, wherein said opposite receptacle end has an internal receptacle opening extending generally axially therethrough, said opposite receptacle end being adjacent said closed opposite base end when said receptacle is in said retracted position and being spaced axially away from said closed opposite base end when said receptacle is in said extended position, said internal receptacle opening being smaller than the internal diameter of said receptacle.

11. An accessory assembly according to claim 10, wherein said receptacle is adapted for receiving and holding a generally cylindrical item of a first diameter placed therein when in said retracted position, said receptacle being adapted for receiving and holding a generally cylindrical item of a second diameter when in said extended position, said second diameter being less than said first diameter, said first diameter cylindrical item contacting said opposite receptacle end to be axially supported thereby when placed in said receptacle, and said second diameter cylindrical item extending through said internal receptacle opening to be radially supported by said opposite receptacle end and contacting said closed opposite base end to be axially supported thereby when placed in said receptacle.

12. An accessory assembly according to claim 11, further comprising anti-rotation means for substantially preventing rotation of said receptacle in a generally circumferential direction within said base cylinder.

13. An accessory assembly according to claim 12, wherein said anti-rotation means includes a generally axially elongated opening formed in said base sidewall, and a key portion protruding generally radially outwardly from said receptacle, said key portion being slidably received within said axially elongated opening in order to allow said axial movement of said receptacle between said extended and retracted positions while substantially preventing said generally circumferential rotation of said receptacle within said base cylinder.

14. An accessory assembly according to claim 13, wherein said base cylinder and said receptacle each have a cut-out portion of their respective sidewalls, said respective cut-out portions being substantially coextensive and substantially aligned both circumferentially and axially when said receptacle is in said retracted position.

15. An accessory assembly according to claim 14, wherein said aligned cut-out portions of said receptacle and said base cylinder are adapted to receive a generally radially-outwardly protruding portion of said first diameter cylindrical item.

16. An accessory assembly according to claim 15, wherein said first and second diameter cylindrical items are liquid containers.

17. An accessory assembly according to claim 1, wherein said resiliently deflectable protuberance means contacts a radially-outer wall portion of said recess when said receptacle is in said extended position and contacts said tapered portion of said base sidewall when said receptacle is in said retracted position, thereby substantially minimizing any tendency of said receptacle to rattle within said base cylinder.

18. An accessory assembly according to claim 17, wherein said radially-outer wall portion of said recess and the area of contact of said protuberance means with said tapered base sidewall portion are at substantially equal radial distances from the of said receptacle and said base cylinder.

19. An accessory assembly for a vehicle interior comprising:
   a base portion having a generally hollow base cylinder formed therein, said base cylinder having a base sidewall, an open base end, and a closed opposite base end; and
   a generally hollow cylindrical receptacle having a receptacle sidewall, an open receptacle end, and an opposite receptacle end, said receptacle being disposed substantially coaxially within said base cylinder with said open receptacle end and said open base end facing in the same axial direction, said receptacle being adapted to receive an item placed therein and further being selectively and slidably movable in an axial direction within said base cylinder between an extended position and a retracted position,
said base cylinder having at least one recess formed in said base sidewall, and said receptacle having resiliently deflectable protuberance means protruding radially outwardly therefrom, said protuberance means being resiliently biased radially outwardly for engaging and being received in said recess to hold said receptacle in said extended position when said receptacle is selectively moved thereto, a portion of said base sidewall tapering radially outwardly from said recess to said closed opposite base end in order to accommodate said resiliently deflectable protuberance means when said receptacle is in said retracted position, said tapered portion of said base sidewall resiliently urging said protuberance means radially inwardly as said receptacle is moved axially from said retracted position toward said extended position, said resiliently deflectable protuberance means contacting a radially-outer wall portion of said recess when said receptacle is in said extended position and contacts said tapered portion of said base sidewall when said receptacle is in said retracted position, thereby substantially minimizing any tendency of said receptacle to rattle within said base cylinder, and said radially-outer wall portion of said recess and the area of contact of said protuberance means with said tapered base sidewall portion being at substantially equal radial distances from that of said receptacle and said base cylinder, said resiliently deflectable protuberance means including a ramp portion thereon, said ramp portion facing in a direction generally toward said retracted position in order to exert a generally radially inwardly-directed camming force on said protuberance means to resiliently deflect said protuberance means radially inwardly out of engagement with said recess when said receptacle is urged toward said retracted position in order to disengage said protuberance means from said recess and to thereby allow said receptacle to be selectively moved from said extended position to said retracted position, said opposite receptacle end having an internal receptacle opening extending generally axially therethrough, said opposite receptacle end being adjacent said closed opposite base end when said receptacle is in said retracted position and being spaced axially away from said closed opposite base end when said receptacle is in said extended position, said internal receptacle opening being smaller than the internal diameter of said receptacle, said receptacle being adapted for receiving and holding a generally cylindrical item of a first diameter placed therein when in said retracted position, said receptacle being adapted for receiving and holding a generally cylindrical item of a second diameter when in said extended position, said second diameter being less than said first diameter, said first diameter cylindrical item contacting said opposite receptacle end to be axially supported thereby when placed in said receptacle, and said second diameter cylindrical item extending through said internal receptacle opening to be radially supported by said opposite receptacle end and contacting said closed opposite base end to be axially supported thereby when placed in said receptacle.

20. An accessory assembly according to claim 19, wherein said recess comprises a circumferentially-extending recessed groove form in said base sidewall, said protuberance means including resiliently deflectable fingers on said receptacle, said fingers having barb portions and said ramp portions thereon, said barb portions being resiliently biased radially outwardly by said fingers in order to be received in said recessed groove when said receptacle is selectively moved to said extended position.

21. An accessory assembly according to claim 19, wherein said base sidewall includes a number of said recesses formed therein, said protuberance means including resiliently deflectable fingers on said receptacle, said fingers having barb portions and said ramp portions thereon, said barb portions each being resiliently biased radially outwardly by said fingers in order to be received within one of said recesses when said receptacle is selectively moved to said extended position.

22. An accessory assembly according to claim 19, further comprising antirotation means for substantially preventing rotation of said receptacle in a generally circumferential direction within said base cylinder.

23. An accessory assembly according to claim 22, wherein said anti-rotation means includes a generally axially elongated opening formed in said base sidewall, and a key portion protruding generally radially outwardly from said receptacle, said key portion being slidably received within said axially elongated opening in order to allow said axial movement of said receptacle between said extended and retracted positions while substantially preventing said generally circumferential rotation of said receptacle within said base cylinder.

24. An accessory assembly according to claim 23, wherein said base cylinder and said receptacle each have a cut-out portion of their respective sidewalls, said respective cut-out portions being substantially coextensive and substantially aligned both circumferentially and axially when said receptacle is in said retracted position.

25. An accessory assembly according to claim 24, wherein said aligned cut-out portions of said receptacle and said base cylinder are adapted to receive a generally radially-outwardly protruding portion of said first diameter cylindrical item.

26. An accessory assembly according to claim 25, wherein said first and second diameter cylindrical items are liquid containers.

27. A liquid container holder assembly for a vehicle interior, said assembly being adapted for receiving and holding liquid containers of at least a first diameter and a second diameter, said assembly comprising:
a base portion having a generally hollow base cylinder formed therein, said base cylinder having a base sidewall, an open base end, and a closed opposite base end; and
a generally hollow cylindrical receptacle having a receptacle sidewall, an open receptacle end, and an opposite receptacle end, said receptacle being disposed substantially coaxially within said base cylinder with said open receptacle end and said open base end facing in the same axial direction, said receptacle being adapted to receive an item placed therein and further being selectively and slidably movable in an axial direction within said base cylinder between an extended position and a retracted position,
said base cylinder having at least one recess formed in said base sidewall, and said receptacle having resiliently deflectable protuberance means protruding radially outwardly therefrom, said protuberance means being resiliently biased radially outwardly for engaging and being received in said recess to hold said receptacle in said extended position when said receptacle is selectively moved thereto, a portion of said base sidewall tapering radially outwardly from said recess to said closed opposite base end in order to accommodate said resiliently deflectable protuberance means when said receptacle is in said retracted position, said tapered portion of said base sidewall resiliently urging said protuberance means radially inwardly as said receptacle is moved axially from said retracted position toward said extended position, said resiliently deflectable protuberance means contacting a radially-outer wall portion of said recess when said receptacle is in said extended position and contacts said tapered portion of said base sidewall when said receptacle is in said retracted position, thereby substantially minimizing any tendency of said receptacle to rattle within said base cylinder, and said radially-outer wall portion of said recess and the area of contact of said protuberance means with said tapered base sidewall portion are at substantially equal radial distances from the of said receptacle and said base cylinder, said resiliently deflectable protuberance means including a ramp portion thereon, said ramp portion facing in a direction generally toward said retracted position in order to exert a generally radially inwardly-directed camming force on said protuberance means to resiliently deflect said protuberance means radially inwardly out of engagement with said recess when said receptacle is urged toward said retracted position in order to disengage said protuberance means from said recess and to thereby allow said receptacle to be selectively moved from said extended position to said retracted position, said opposite receptacle end having an internal receptacle opening extending generally axially therethrough, said opposite receptacle end being adjacent said closed opposite base end when said receptacle is in said retracted position and being spaced axially away from said closed opposite base end when said receptacle is in said extended position, said internal receptacle opening being smaller than the internal diameter of said receptacle, said receptacle being adapted for receiving and holding a liquid container of said first diameter placed therein when in said retracted position, said receptacle being adapted for receiving and holding a liquid container of said second diameter when in said extended position, said second diameter being less than said first diameter, said first diameter liquid container contacting said opposite receptacle end to be axially supported thereby when placed in said receptacle, and said second diameter liquid container extending through said internal receptacle opening to be radially supported by said opposite receptacle end and contacting said closed opposite base end to be axially supported thereby when placed in said receptacle.

28. An accessory assembly according to claim 27, wherein said recess comprises a circumferentially-extending recessed groove form in said base sidewall, said protuberance means including resiliently deflectable fingers on said receptacle, said fingers having barb portions and said ramp portions thereon, said barb portions being resiliently biased radially outwardly by said fingers in order to be received in said recessed groove when said receptacle is selectively moved to said extended position.

29. An accessory assembly according to claim 27, wherein said base sidewall includes a number of said recesses formed therein, said protuberance means including resiliently deflectable fingers on said receptacle, said fingers having barb portions and said ramp portions thereon, said barb portions each being resiliently biased radially outwardly by said fingers in order to be received within one of said recesses when said receptacle is selectively moved to said extended position.

30. An accessory assembly according to claim 27, further comprising anti-rotation means for substantially preventing rotation of said receptacle in a generally circumferential direction within said base cylinder.

31. An accessory assembly according to claim 30, wherein said anti-rotation means includes a generally axially elongated opening formed in said base sidewall, and a key portion protruding generally radially outwardly from said receptacle, said key portion being slidably received within said axially elongated opening in order to allow said axial movement of said receptacle between said extended and retracted positions while substantially preventing said generally circumferential rotation of said receptacle within said base cylinder.

32. An accessory assembly according to claim 31, wherein said base cylinder and said receptacle each have a cut-out portion of their respective sidewalls, said respective cut-out portions being substantially coextensive and substantially aligned both circumferentially and axially when said receptacle is in said retracted position.

33. An accessory assembly according to claim 32, wherein said aligned cut-out portions of said receptacle and said base cylinder are adapted to receive a generally radially-outwardly protruding handle portion of a liquid container.

* * * * *